April 9, 1968     J. W. BROWN, JR., ET AL     3,377,459
METHOD AND APPARATUS FOR HELICALLY WELDING STRIP MATERIAL
Original Filed June 6, 1963     10 Sheets-Sheet 3

INVENTORS.
JOHN W. BROWN JR. &
ROBERT W. KAASE
BY Bosworth, Sessions,
Herrstrom & Knowles
ATTORNEYS.

INVENTORS.
JOHN W. BROWN JR. &
ROBERT W. KAASE
BY Bosworth, Sessions,
Herrstrom & Knowles
ATTORNEYS.

April 9, 1968   J. W. BROWN, JR., ET AL   3,377,459
METHOD AND APPARATUS FOR HELICALLY WELDING STRIP MATERIAL
Original Filed June 6, 1963

INVENTORS
JOHN W. BROWN JR. &
ROBERT W. KAASE
BY Bosworth, Sessions,
Herrstrom & Knowles
ATTORNEYS.

United States Patent Office 3,377,459
Patented Apr. 9, 1968

3,377,459
METHOD AND APPARATUS FOR HELICALLY WELDING STRIP MATERIAL
John W. Brown, Jr., Lakewood, and Robert W. Kaase, Bay Village, Ohio, assignors to Brown Fintube Company, Elyria, Ohio, a corporation of Ohio
Continuation of abandoned application Ser. No. 285,953, June 6, 1963. This application Mar. 1, 1967, Ser. No. 619,870
10 Claims. (Cl. 219—107)

ABSTRACT OF THE DISCLOSURE

Apparatus and method for bending and welding a metal strip helically on edge about a generally cylindrical member utilizing high frequency electrical current, according to which an electrode is applied to the generally cylindrical member and another electrode is applied to the side of the metal strip that faces the edge thereof that is welded to the generally cylindrical member.

*Cross-reference to related application*

This application is a continuation of applicants' copending application Ser. No. 285,953, filed June 6, 1963.

*Description*

This invention relates to method and apparatus for helically welding metal strip material on the outer surface of an elongated metal member of generally circular cross section, and to helically finned tubes that may be produced thereby.

While capable of other applications, the invention provides particular advantages in the manufacture of transversely finned tubes for use in heat exchangers in which one heat exchange fluid passes through such a tube and another heat exchange fluid passes outside of the tube transversely thereof. In order to achieve the desired large heat transfer area, the outer surface of the tube has closely spaced fins that extend radially transversely of the tube. It is advantageous to make such a finned tube by welding a strip of metal along one of its edges in a helical path onto the outside of the tube to form the fins; the weld preferably should be homogeneous and continuous to provide good heat conductivity between the tube and the fin.

An object of the present invention is the provision of method and apparatus for rapidly and economically manufacturing high quality elongated members having strip material welded thereon in a helical path, at a high rate of production with little or no loss due to substandard manufacturing. A further object is the provision of adjustable apparatus which can be used to weld fins or the like of various depth on tubes or other generally circular elongated members of a wide variety of sizes, in helices of various pitches. Another object is the provision of a finned tube, suitable for heat exchange purposes, comprising a helical fin of thin metal that is welded throughout its length to the exterior of the tube, the lower portion of the fin immediately adjacent the tube being substantially thicker than the remainder of the fin to provide a relatively wide juncture with the tube and good heating conductivity.

These and other objects of the invention will be apparent from the following description in connection with the accompanying drawings in which.

*General arrangement.*—As indicated in the drawings, and particularly in FIGURES 1, 2, 3 and 7, the illustrated apparatus supports, rotates and longitudinally advances a tube T with its axis essentially coincident with a pass line A so the tube moves in the direction indicated by the arrows, while welding a thin strip of metal S to the exterior of the tube T in a desired helical path to form spaced helical fins F.

The apparatus comprises a fixed base 1 rigidly carrying an adjustable tube rotating and advancing unit 2 that is driven through transmission unit 3 and air operated clutch 4 from a conventional variable speed power unit 5; clutch 4 is engaged and disengaged as required, while the unit 5 operates continuously. Base 1 also carries an adjustable welding head 6 that guides the strip S to the tube T at an angle suitable for forming a helix having the desired spacing between the turns, aids the tube in bending the strip edgewise around the surface of the tube, and welds the bottom edge of the strip to the tube in a desired helical path by suitable electrical current of at least about 50,000 cycles per second frequency. The welding head 6 is mounted on base 1 so it can be adjusted and rigidly held in various positions about an axis B that is essentially perpendicular and vertical to, and essentially intersects, the pass line A. The welding current is supplied from a suitable commercially available source 7 through a commercially available transformer 8. The strip S is drawn from a coil C on a rotatable drum 9; the edge to be welded of the strip preferably is square and smooth. The finned portion of the tube leaving the welding head moves over a support 10 which supports the tube while permitting it to rotate and move longitudinally. Base 1 is surrounded by a sump 1a for collecting cooling liquid that is recirculated conventionally.

*Tube rotating and advancing unit.*—The tube drive unit 2 (FIGURES 5, 6 and 7) for rotating and advancing the tube T comprises a frame 11 fixed to base 1 through adjusting block 12. Frame 11 supports three rollers 13, 14 and 15 essentially equiangularly spaced around the pass line A in skewed tube-gripping and advancing relation. Each roller comprises two spaced roller portions 16 and 17 rigidly demountably fixed to an axle 18 by suitable conventional means not shown. Each roller portion preferably has a tube-engaging surface 19 that is tapered to decrease in size toward the other roller portion, to aid in gripping the tube; the surfaces 19 may be knurled to increase friction. Each roller 13, 14 and 15 can be adjusted so it axis of rotation R is in a desired fixed skewed relation to the pass line A.

To accomplish this, the axle 18 of each lower roller 13 and 14 is journaled in a supporting member 21 (see FIGURE 5), that includes a stem 22 of circular cross section about an axis U perpendicular to and intersecting the pass line A and the center of the axis of rotation R of the roller carried by the member 21. The stem 22 is mounted for rotatable adjustment about axis U in a block 23 rigidly fixed to the spaced side plates 24 of frame 11; the side plates having openings 25 through which the tube T travels. Stem 22 is nonrotatably fixed to a member 27 (FIGURES 5 and 6) having an arm 28 carrying an indicating pointer 29; the stem also has a threaded end carrying lock nuts 31. Block 23 rigidly supports a bracket threadedly carrying adjusting screws 33 bearing against one of the sides of member 21; block 23 also carries an indicating dial 34 having markings 35 adjacent pointer 29 to indicate the amount of skew of the axis R of the associated roller. Roller-supporting member 21 can thus be adjusted and locked in a desired angular position by the adjusting screws 33 and lock nuts 31, with the aid of arm 28, pointer 29 and dial 34.

Figure 5:
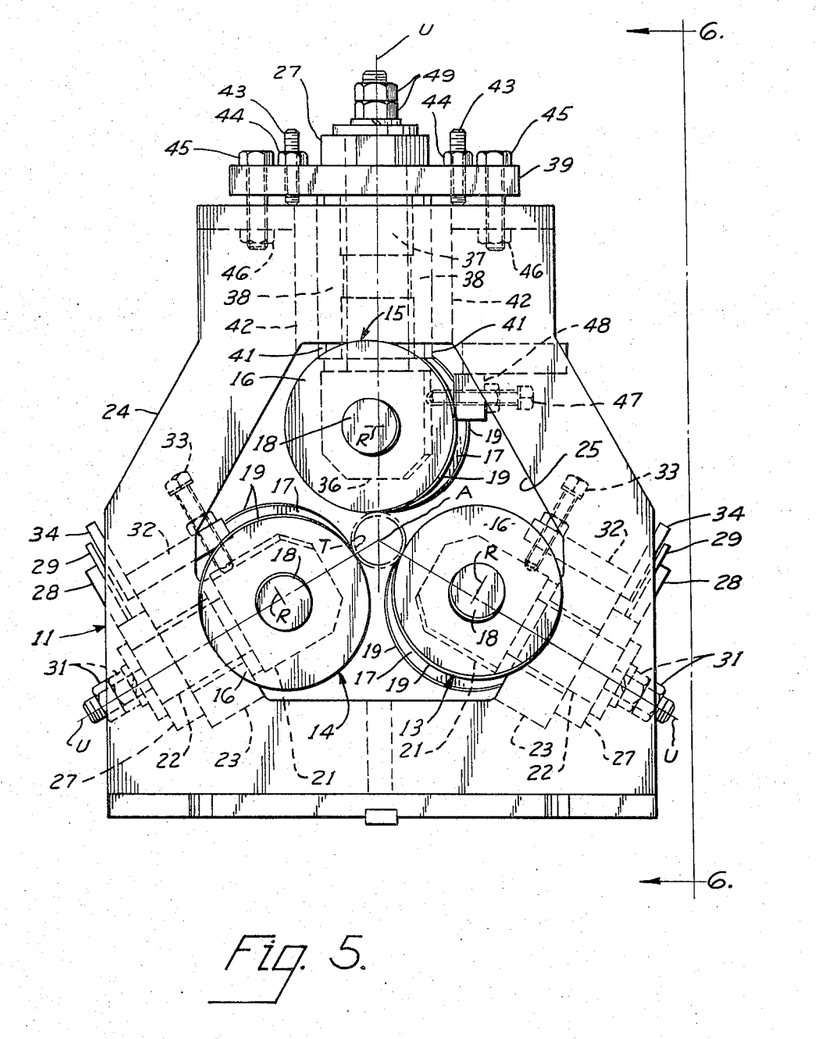
FIGURE 5 is an elevation of the tube-advancing unit of the apparatus from line 5—5 of FIGURES 1 and 6, to a scale larger than that of any of the preceding figures.
Figure 6:
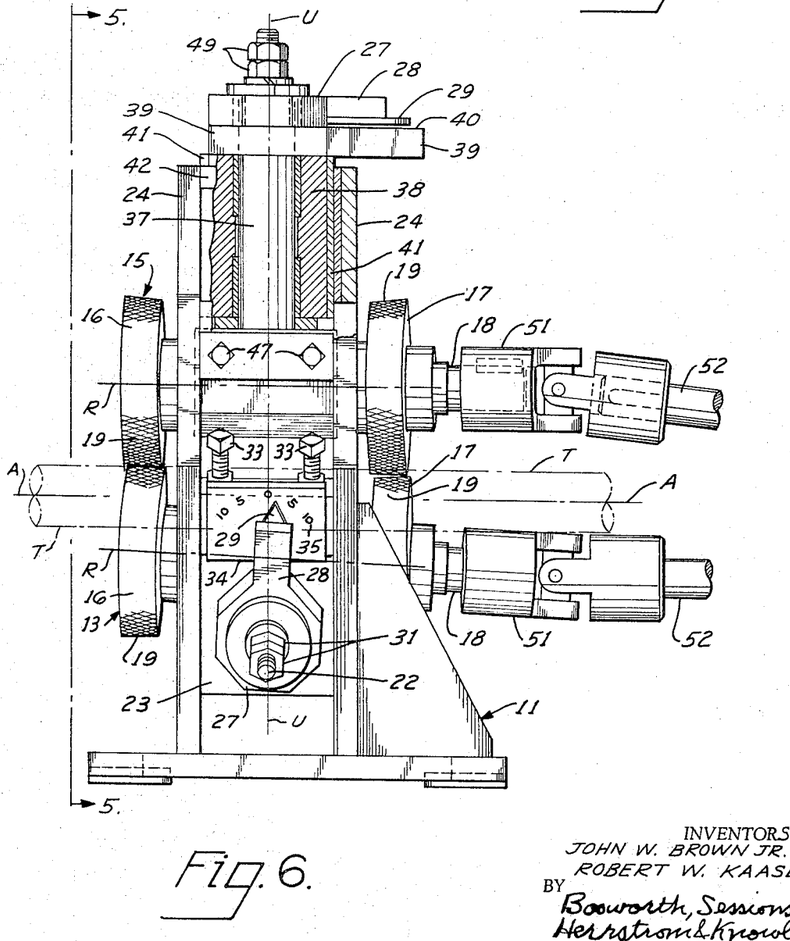
FIGURE 6 is a side elevation of the unit of FIGURE 5 from line 6—6 thereof and to the same scale, parts being broken away to show means for adjusting the angle of skew of the axis of one of the drive rollers relatively to the axis of the tube.
Figure 7:
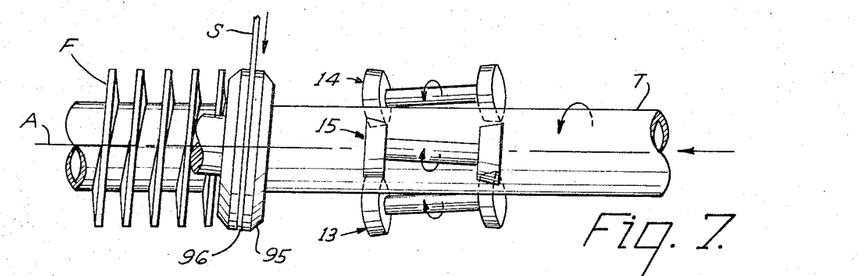
FIGURE 7 is a diagrammatic plan showing a tube to which the helical fin is being welded according to the invention, this plan also indicating the general relationship of the skewed rollers that support, rotate and advance the tube longitudinally thereof, and a roller that guides and holds down the strip being welded on the tube.

The uppermost roller 15 (FIGURES 5 and 6) can be similarly adjusted and locked so its axis R is in any one of a variety of skewed positions as desired, but it also may be adjusted so its axis R may be moved toward or away from the pass line A to cause the tube T to be firmly engaged by all three skewed rollers. As shown in FIGURES 5 and 6, the axle 18 of roller 15 is journaled in a supporting member 36 having a stem 37 circular in cross section about an axis U that is perpendicular to and intersects both pass line A and the center of axis R of roller 15. Stem 37 is rotatably adjustably mounted in a vertically adjustable member 38 rigidly carrying a transverse member 39 at its upper end. This member 38 is slidably but not rotatably mounted in frame 12 of unit 2, by guide portions 41 that engage cooperating guide portions in a block 42 rigidly fixed between side plates 24 of frame 11. The upper portion of stem 37 of supporting member 36 has keyed to it an adjusting member 27 carrying an arm 28 and a pointer 29 movable angularly when member 36 is adjusted about its axis to indicate the angular adjustment by markings on a dial portion 40 of member 39.

The assembly comprising the adjustable member 38, the roller-supporting member 36, and the roller 15 can be adjusted toward and away from the pass line A and locked in the adjusted position by set screws 43, having lock nuts 44, threaded into transverse member 39 and operating in compression with their lower ends bearing against the top of frame 11, and by cap bolts 45, having nuts 46, extending in tension between the cross member 39 and frame 11 as shown in FIGURE 5.

The angle of skew of the axis R of roller 15 can be adjusted relatively to pass line A, and the roller can be locked in place at the desired angle, by bolts 47 threaded in bracket 48 on the frame 11 and bearing against supporting member 36, and by lock nuts 49 on the end of stem 37.

The axes U about which the supporting members 21 for rollers 13 and 14 and the supporting member 36 for roller 15 are pivotally adjustable intersect the axes R of their respective rollers and the pass line A, and are preferably equiangularly spaced about the pass line A in a plane normal to the pass line; in normal operation the parts are adjusted as indicated so that the axes R are essentially equally spaced from and equally skewed in the same direction to the pass line A.

Figure 1:
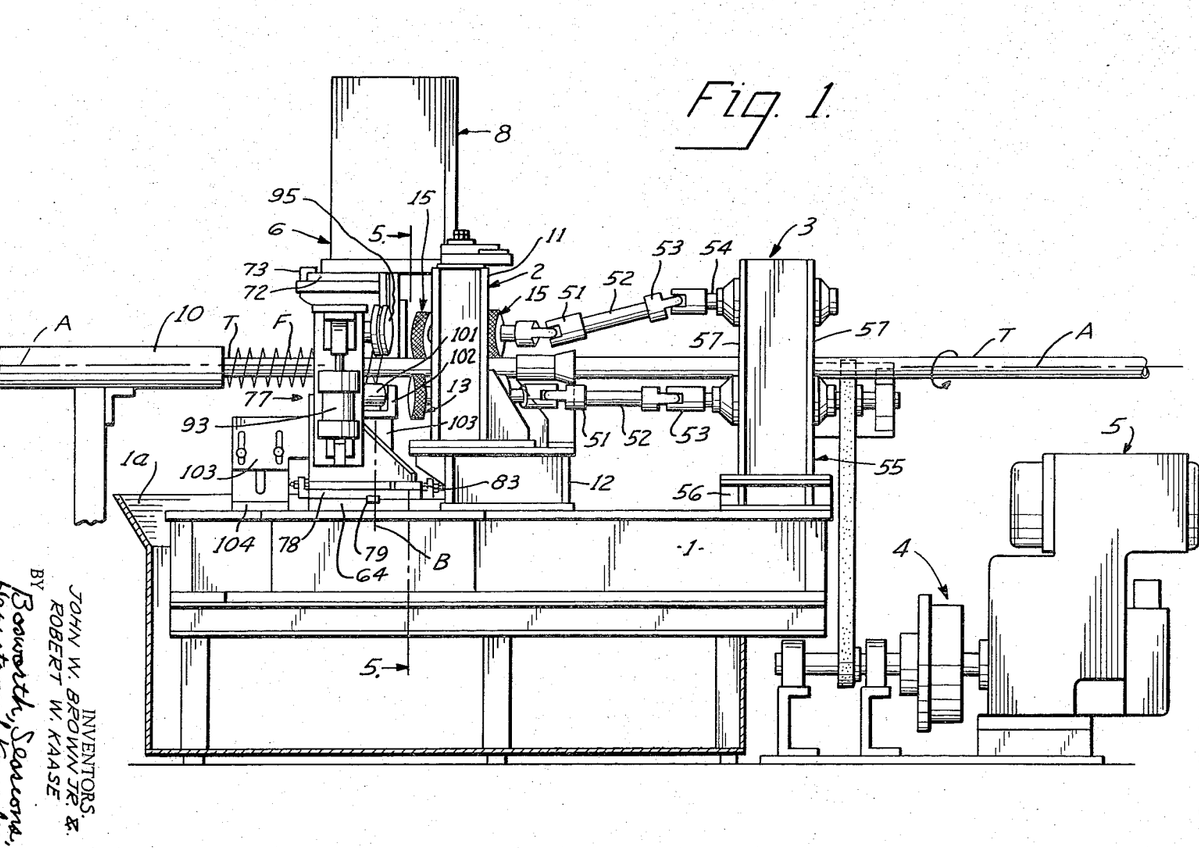
FIGURE 1 is a front elevation of one form of apparatus embodying the invention, shown as used for welding a strip of metal on a tube to form a helically finned tube, parts of the cooling liquid sump being broken away for clearness.
Figure 2:
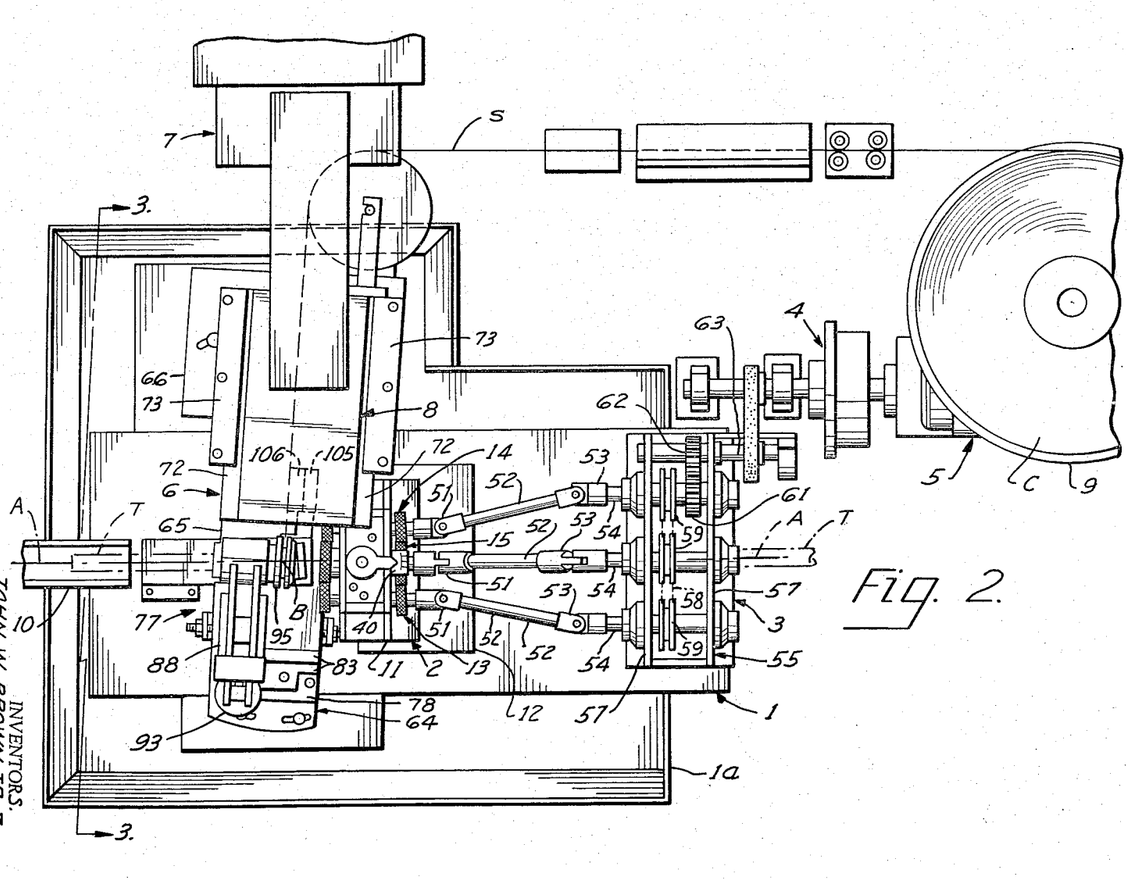
FIGURE 2 is a plan of the apparatus of FIGURE 1, to the same scale.

The rollers 13, 14 and 15 of unit 2 are positively driven in any position to which they may be adjusted about the axes R since, as shown in FIGURES 1, 2 and 6, each of their shafts 18 is connected to universal joint 51, intermediate shaft 52, and universal joint 53 to one of the shafts 54 of the transmission unit 3 connected to the drive system 4.

*Transmission unit.*—The transmission unit 3 (FIGURES 2 and 3) includes a frame 55 fixed to base 1 through an adjusted block 56. The frame includes upwardly extending plate frame members 57 apertured for passage of tube T. The three shafts 54 are journaled in these members 57 about axes equidistantly and equiangularly spaced around the pass line A. Shafts 54 are simultaneously rotated in the same direction and at the same speed by a chain belt 58 passing around sprockets 59 fixed to the shafts. One shaft 59 is driven by gear 61 rotated by gear 62 mounted on a countershaft 63 driven by drive means 4 from power unit 5.

The tube T is thus simultaneously rotated and advanced from the welding head 6 at a predetermined speed of rotation and advance. For a tube of given size, the speed of rotation can be adjusted by adjustment of the speed of the power unit 5, and the amount the tube advances during each revolution can be predetermined by adjusting the skew angles of the rollers 13, 14 and 15 of the unit 2 as described above. Within limits, tubes of larger or smaller sizes than those predetermined by the dimensions of the unit 2 may be handled by changing the sizes of the rollers 13, 14 and 15; if it is desired to handle tubes of larger or smaller sizes than can be accommodated by changing rollers in a given unit 2, the unit itself may be replaced by another in which the axes of the rollers are radially spaced at a suitable distance from the pass line A. To facilitate this, adjusting block 12 on which unit 2 is mounted may be replaced by another block of suitable thickness. The adjusting block 56 on which the transmission unit 3 is mounted may also be changed if necessary.

*Welding head.*—The welding head 6 (FIGURES 1 to 4 and 8 to 13) comprises a base member 64 that is mounted on base 1 for pivotal adjustment about an axis B (FIGURES 1, 2 and 3) that is essentially vertical and intersects the pass line A. As shown in FIGURE 4, base member 64 is a plate generally T-shaped in plan having a parallel-sided front portion 65 and a wider rear portion 66. Front portion 65 has a hole through which a stud 67 extends into the top of the top of the base member 64 for the desired pivotal movement about axis B. The member 64 has curved slots 68, centered on axis B, through which project locking bolts 69 threaded into base 1. Base member 64 thus can be adjusted to and locked in any one of a variety of angular positions about axis B.

A pedestal 71 is rigidly mounted at one side of the rear portion 66 of base member 64 to clear the strip S as it passes to the tube T. Pedestal 71 is made up of lower part 71a, upper part 71b, and a replaceable plate 71c (FIGURE 3) to permit vertical adjustment of the parts carried by the pedestal. Pedestal 71 carries high frequency transformer 8, which as shown in FIGURES 1 and 2, at its lower side edges has lugs 72 that are clamped by gibs 73 and bolts 74 to permit the transformer to be slidably adjusted toward and away from the axis A in a path parallel to the sides of the base member 64, and be clamped in the desired location. This permits the welding electrodes 75 and 76 (FIGURES 3, 9–13) that respectively contact the tube and fin and that are supported from the transformer 8, to be adjusted toward or away from the pass line A.

The front portion 65 of base member 64 also rigidly adjustably carries a fin hold-down unit 77 (FIGURES 1–4) that is adjustable longitudinally and transversely of portion 65. To achieve this, a base plate 78 is mounted on portion 65 by key means 79 (FIGURE 1) and bolts 81 threaded into base member 64 and extending through slots 82 in member 78 (FIGURE 4) so that member 78 can be adjusted longitudinally of portion 65 and clamped in place. Another base plate 83 is adjustably mounted on member 78 by bolts 84 threaded into member 78 and extending through slots 85 in member 83 (FIGURE 4) and by screws 86 that bear against the sides of member 83 and are threaded in brackets 87 fixed to the side edges of front portion 65 of base member 64, so that member 83 can be adjusted transversely of member 64 and locked in place.

The fin hold-down unit 77, as shown in FIGURES 1–4, comprises an upright support 88 rigidly mounted on base member 83 and at its upper end pivotally carrying on shaft 89 an arm 91. One end of the arm 91 is connected to a piston rod 92 of an air cylinder 93 the lower end of which is pivotally connected at 94 to the support 88. The other end of arm 91 rotatably carries a grooved roller 95 (FIGURES 1–4 and 7), the groove 96 of which engages the strip S where it begins bending edgewise around the tube to guide the strip and hold it down in the tube as it bends. This roller preferably is formed of heat resistant metal that will not weld to the metal of the fin or the tube, such as a suitable copper alloy like that sold under the name "Ampco." The radial groove 96 is wide enough to receive the strip but narrow enough accurately to guide it, and deep enough to facilitate the guiding and holding down of the strip but less deep than the width of the strip. A set screw 97, threaded into a bracket 98 fixed to frame 88, engages arm 91 to limit adjustably the movement of the roller 95 toward the tube T.

The groove of the roller thus can be adjusted to be in any desired position angularly and transversely relatively to the pass line A, and the roller can be positively moved toward and away from the tube T by the air cylinder 93.

Base 1 also carries a supporting roller 101 (FIGURES 1, 3 and 4) located beneath the tube T engaging the outer edges of several of the fins F to prevent undesired downward deflection of the tube under the forces resulting from edgewise bending of the strip S and from the upper roller 95. Roller 101 is journaled in a bracket 102 that is rigidly fixed but pivotally adjustable about a vertical axis on a frame 103 rigidly but vertically adjustably mounted on a support 104 fixed to base 1. By such adjustable supporting means, the roller may be adjusted vertically to contact the fins at the lower portion of the tube, being wide enough to contact several fins, and can be angularly adjusted about a vertical axis so the axis of rotation of the roller is perpendicular to the direction of the fins at the points of contact of the roller with the fins, to provide rolling supporting contact.

*Electrode supporting means.*—The means for holding the welding electrodes 75 and 76 in slidable contact with the strip and the tube to supply the welding current that forms the welded joint between the strip and the tube are shown in FIGURES 3 and 8 to 13 inclusive. These electrodes are supported from two spaced electrically isolated power supply bars 105 and 106 extending downwardly from and forming part of transformer 8. These bars preferably are formed of copper or other metal having the desired strength and electrical conductivity, are provided with water cooling openings 107 and 108, and have flanged bottom portions to which are bolted the electrode supporting means described below.

Figure 8:
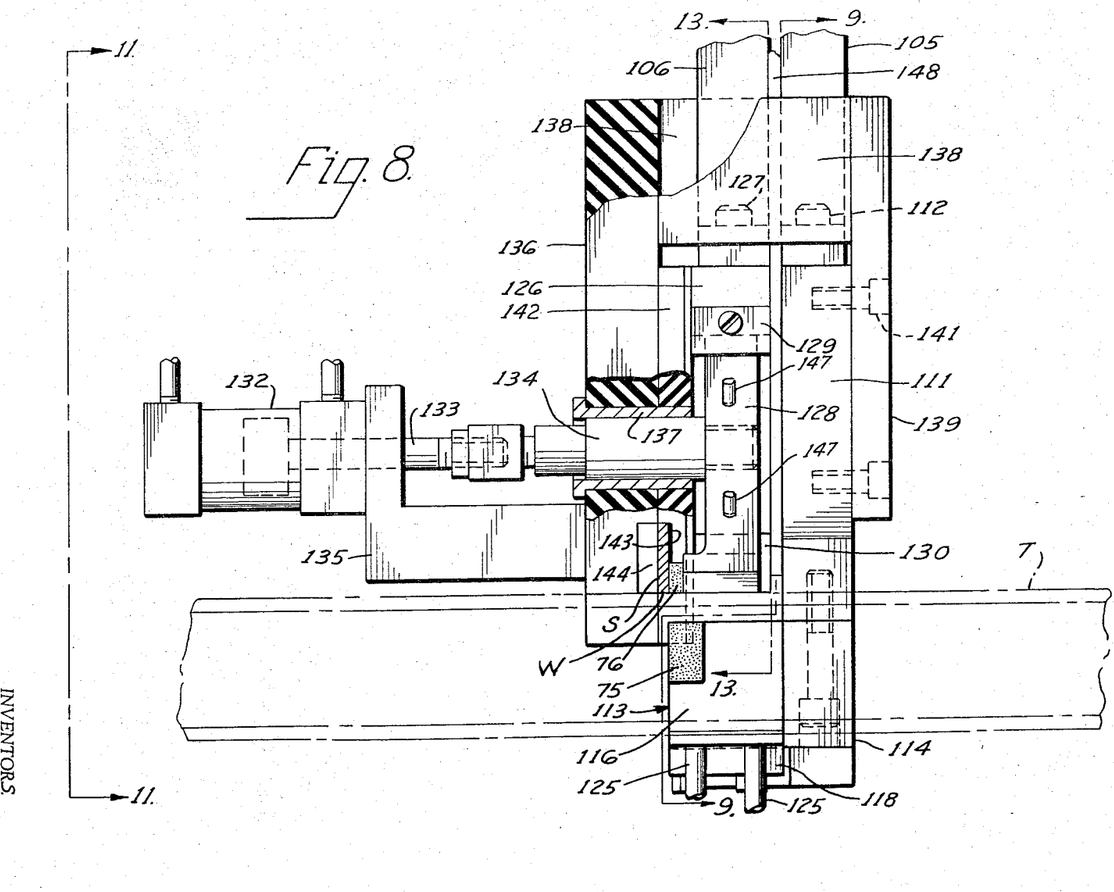
FIGURE 8 is a detail view, along line 8—8 of FIGURE 3 and to a larger scale, of the tube and the portion of the apparatus embodying the electrodes that contact the strip being welded to the tube, the tube being shown in broken lines.
Figures 9, 10:
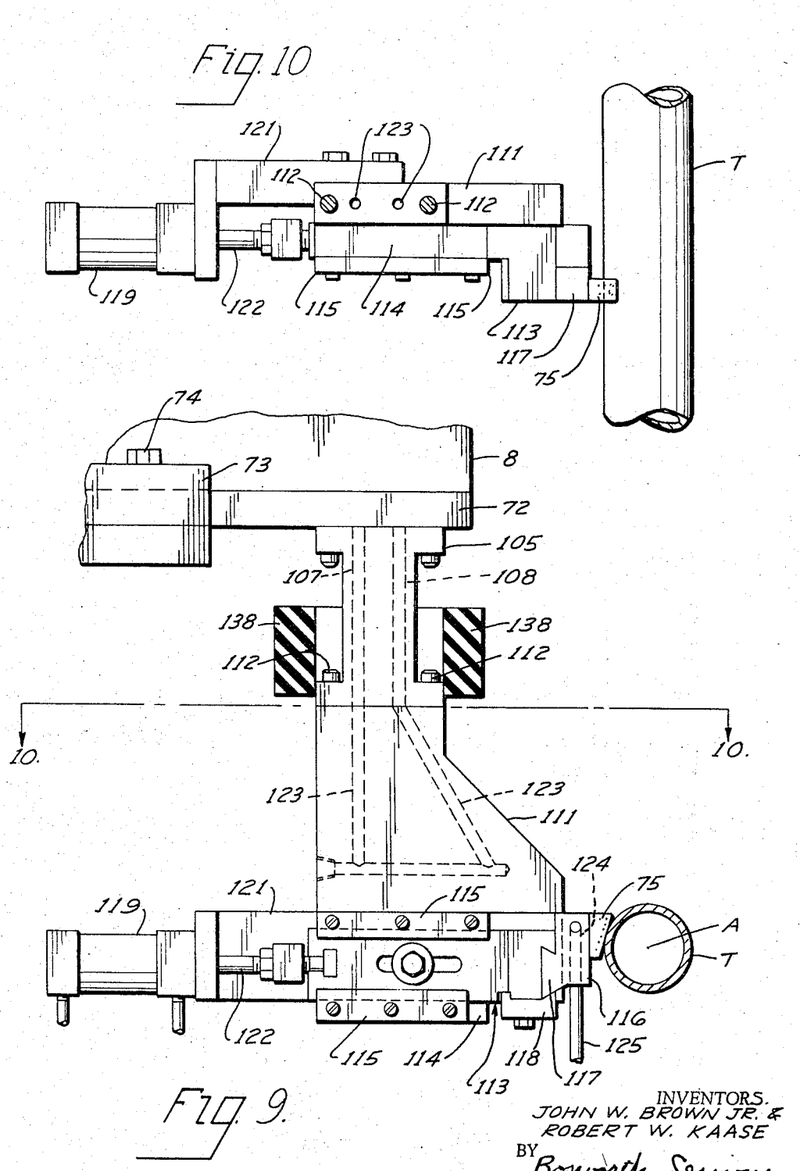
FIGURE 9 is a side elevation of the tube-contacting electrode means, generally along line 9—9 of FIGURE 8 and to a somewhat smaller scale.
FIGURE 10 is a sectional view along line 10—10 of FIGURE 9 and to the same scale.

As shown in FIGURES 8–10, the means for supporting the tube-contacting electrode 75 comprises a downwardly extending bracket 111 fixed by screws 112 to the bottom of the electrode bar 105. The lower end of this bracket slidably supports for movement toward and away from the pass line A a member 113 on which the electrode 75 is mounted. Slide member 113 is thus supported by a guide member 114 bolted to the bottom of bracket 111 and by gibs 115 bolted to guide member 114. At its end nearest the pass line A member 113 carries a member 116 having a dove-tail portion 117 extending parallel to pass line A; this portion is clamped onto the end of member 113 by gib 118. Member 116, to which the electrode 75 is fixed, thus can be adjusted axially of the tube to provide a desired relation with the fin and fin-contacting electrode 76, and then rigidly clamped in place; the member 116 and electrode 75 can readily be removed for repair or replacement of the electrode.

Slide member 113 may be positively moved toward and away from tube T to engage and disengage the electrode 75 and to permit the welding of tubes of different diameters, by an air cylinder 119 mounted on a bracket 121 bolted to the bracket 107 and extending away from the pass line, the air cylinder piston rod 122 being connected to the slide member 113.

Preferably bracket 111 has bores 123 (FIGURES 9 and 10) communicating with openings 107 and 108 of transformer electrode bar 105 to permit circulation of cooling fluid; the member 116 may have bores 124 to permit circulation of cooling fluid by tube 125.

The means for supporting the electrode 76 contacting the strip S being welded is shown in FIGURES 8, 11, 12 and 13. It comprises a downwardly extending bracket 126, formed of copper or other suitable electrically conductive metal, fixed to the bottom of bracket 106 by bolts 127. A slide member 128, to which is fixed the fin-contacting electrode 76, is slidably mounted on bracket 126 by guides 129 and 130, shown in FIGURE 13, for movement parallel to pass line A, so that electrode 76 can be engaged with and disengaged from the strip S as desired.

To positively move slide member 128 there is an air cylinder 132 the piston rod 133 of which is connected to member 134 fixed to slide member 128 (FIGURE 8). Cylinder 132 is mounted on a bracket 135 fixed to a plate member 136 formed of electrical insulating material such as suitable hardboard of sufficient strength and thickness for the purposes. Member 134 slides in a sleeve 137 fixed in member 136. Member 136 itself is rigidly supported by two cross members 138 (FIGURES 8 and 9) that are rigidly carried by a plate member 139, which may be of metal, fixed by bolts 141 to the bracket 111 supporting the tube electrode (FIGURE 8).

Member 136 also carries another plate member 142 of substantially the same outer configuration as plate member 136 below the cross members 138. Plate members 136 and 142 are recessed to define at their juncture a groove 143 extending from the rear of said plate members to the front thereof to conduct the strip S into close proximity to the tube T in a path parallel to the sides of the front portion 65 of the base plate member 64, so that said path brings the strip S to the tube at the proper angle relative to the pass line A and the tube to form the desired helical turns as the tube rotates. The recess in plate member 136 contains a metal strip 144 (FIGURE 8) that acts as a wear and adaptor strip that can be replaced by other strips of different thickness and grooved configurations to modify recess 143 so it can receive and guide strips S of various thicknesses and widths.

Figure 3:
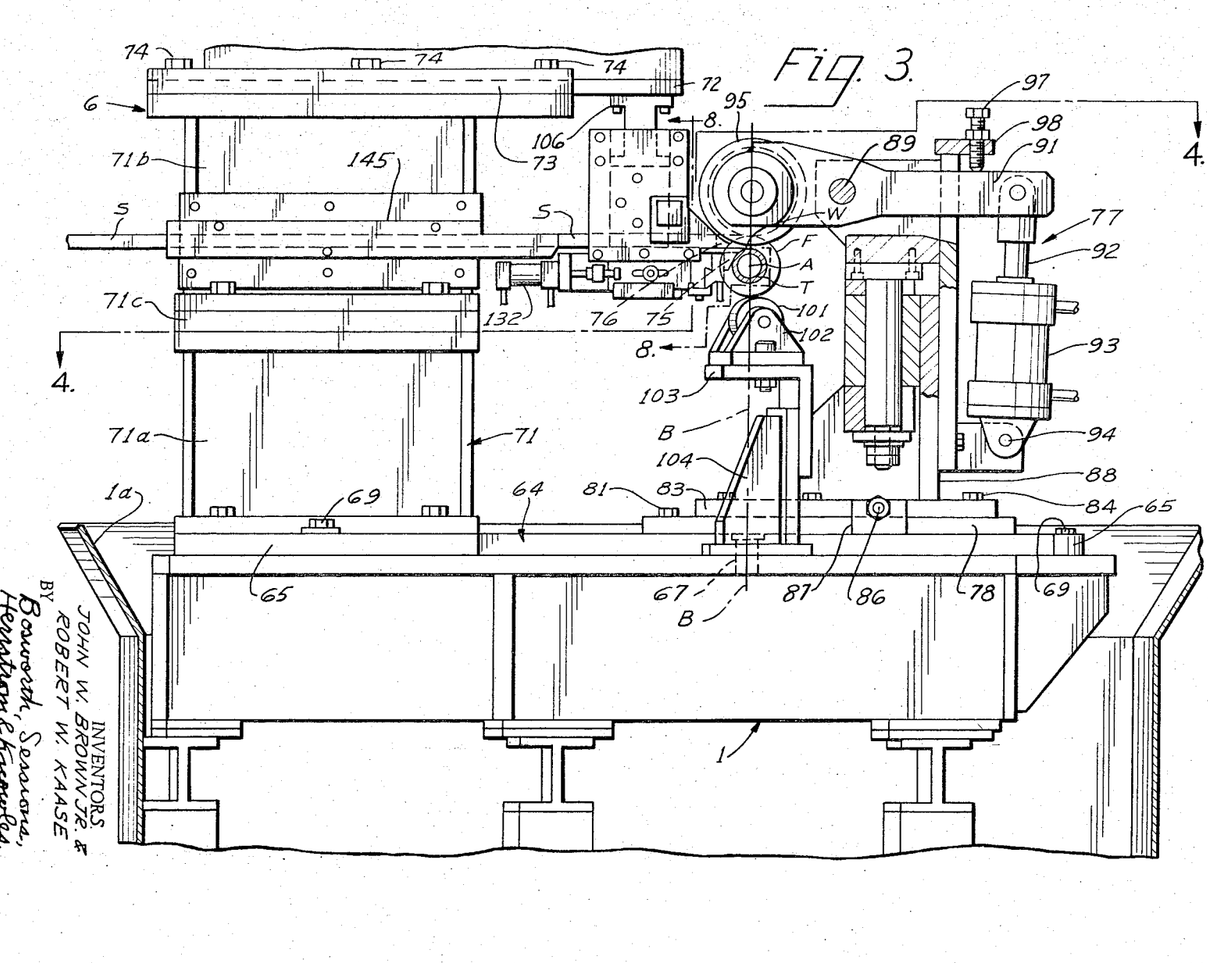
FIGURE 3 is an elevation, from line 3—3 of FIGURE 2, of the welding portion of the apparatus, to an enlarged scale.
Figure 4:
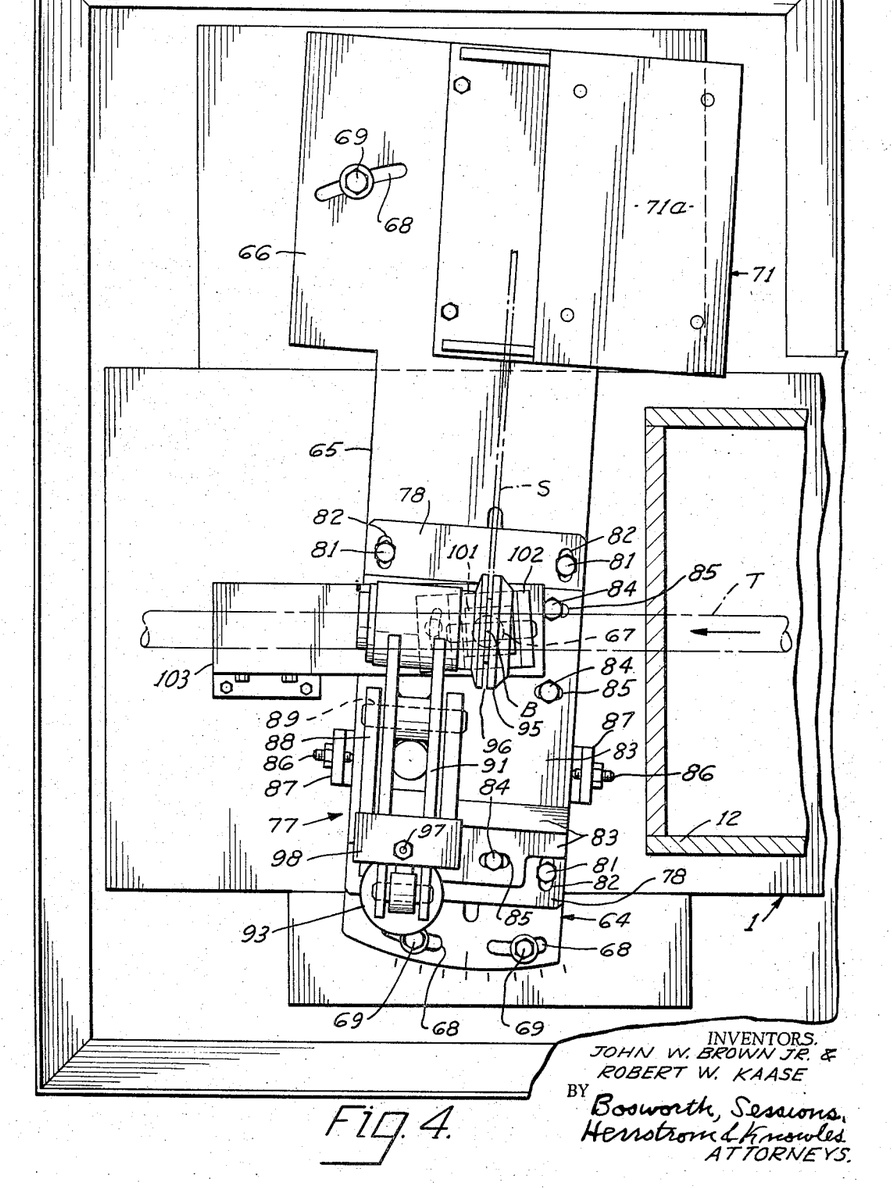
FIGURE 4 is a plan of the portion of the apparatus of FIGURE 3, from line 4—4 of FIGURE 3 and to the same scale.

As shown in FIGURE 3 another guide member 145 is bolted to the upper portion of pedestal 71 to guide the strip S from the rear of the pedestal close to the rear edges of plates 136 and 142; this guide member, which may be formed of suitable wear resistant material, may be adjusted or changed to accommodate strips of different sizes.

The bracket 126 preferably has bores 146 (FIGURES 12 and 13) communicating with openings 107 and 108 of transformer electrode bar 106 to permit circulation of cooling fluid. Slide member 128 is also suitably bored for cooling fluid, which may be circulated through cooling tubes 147 (FIGURES 8, 11–13). If desired, cooling water or the like may be sprinkled on the roller 95 and the tube T and strip S in the vicinity of weld point W by suitable conventional means not shown.

A sheet 148 of electrical insulating material (FIGURE 8) preferably is located between transformer bars 105 and 106 and brackets 111 and 126 to prevent arc-over.

*Operation.*—A preferred method of welding a fin of a desired depth and thickness in a helix of a desired pitch on a tube of a desired outer diameter includes the following operations: A tube-rotating and advancing unit 2 having a frame 11 and a supporting adjusting block 12 to permit the unit 2 to handle a range of tube sizes including the size of tube to be welded is first selected and mounted on the base 1 if the unit 2 and adjusting block 12 already in place are not suitable. If necessary, the rollers 13, 14 and 15 of the unit 2 are replaced by the other rollers which will handle a tube of the size desired. The skew angle of each roller is then adjusted as described above so that as the rollers rotate they advance the tube T the desired amount during each revolution to produce a desired helical pitch of the fin. If necessary the transmission unit 3 which drives the unit 2 is adjusted as indicated previously.

If necessary plate 71c of the pedestal 71 is replaced by another plate of suitable thickness in order to cause the strip S traveling through the guide means 145 and the slot 143 of the electrode supporting means mounted on transformer member 106 to contact the periphery of the tube T at the proper distance above the pass line A; the adaptor strip 114 in such electrode supporting means is changed if necessary to accommodate the strip.

Before or at this time the angle of inclination of the welding head portion of the apparatus relative to the pass line A is adjusted about the axis B and, if necessary, the base members 78 and 83 are adjusted longitudinally and transversely of the base member 74 so that the groove 96 of the upper roller 95 can engage the fin at the proper helix angle relatively to the axis of tube T to produce a helix of the desired pitch. This is facilitated since the roller 95 is so carried by the welding head portion that the axis of the roller is at all times perpendicular to that portion of the strip S first contacting tube T. The roller 95 is then retracted upwardly to clear the tube.

The free end of the strip S is then manually threaded through the guide 145 on the pedestal 71 and the slot 143 on the electrode-supporting means carried by the transformer bar members 105 and 106, and is pulled forwardly over and past tube T. This free end is then curved in the plane of the strip for a short distance so its lower edge can fit the outer surface of the tube. The strip is then moved back until this curved free end contacts the top of the tube. This curved end is then fixed to the tube, as by spot welding in a known manner. The pressing roller 95 is then moved downwardly into operating position by air cylinder 93, the hitherto retracted electrode 75 is brought into contact with the tube by air cylinder 119, and the hitherto retracted electrode 76 is caused to contact the strip S by air cylinder 132. At this time, or after the few helical fin turns have been welded, the lower or back-up roller 101 is adjusted by raising it so the upper portion of its periphery contacts the lower portion of the fins welded on the tube and by adjusting its angle of inclination to the pass line A to provide pure rolling contact with the fins as described above.

The electrical portion of the apparatus is adjusted to supply high frequency current of suitable characteristics having a frequency on the order of 50,000 cycles per second or preferably considerably higher, for example, 350,000 to 450,000 cycles per second. The cooling fluid is caused to circulate through the various bores and passages provided for that purpose. The tube is then rotated by the tube rotating and advancing unit 2 driven by the transmission unit 3 for one or a very few turns, with the welding current off to test the adjustment of the parts and to test whether the free end of the strip is secured to the tube. The welding current is then turned on.

During welding, the electrode 75 slidingly contacts the tube close to the location W at which the strip S first contacts the tube (FIGURES 3, 8, 11 and 13) but at a sufficient distance from the strip to prevent arc-over between the electrode and the strip; electrode 75 is preferably substantially aligned transversely to the tube T with the electrode 76 and location W, as shown in FIGURE 8.

Figure 11:
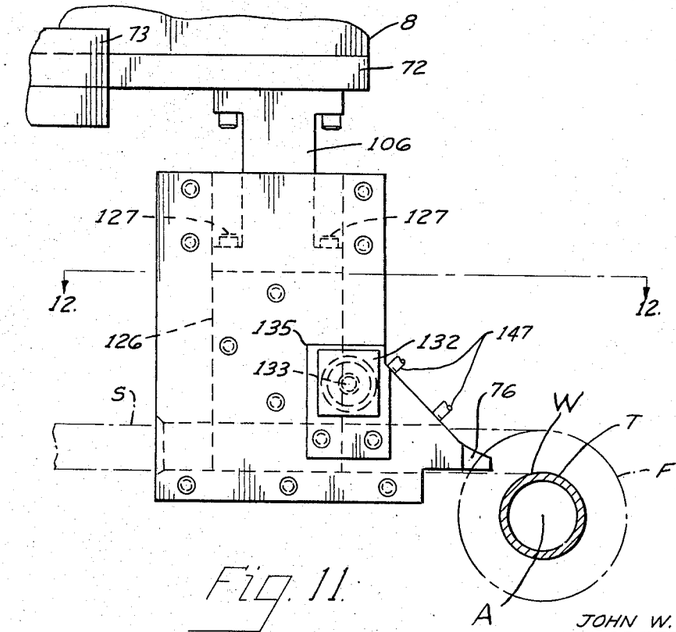
FIGURE 11 is a side elevation of the fin-contacting electrode means from line 11—11 of FIGURES 8 and 12, to the same scale as FIGURES 9 and 10.
Figure 12:
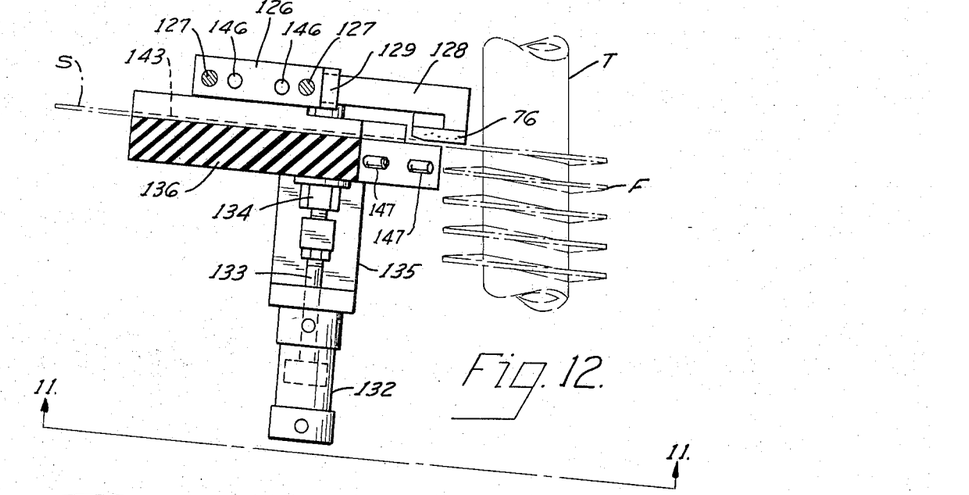
FIGURE 12 is a sectional view from line 12—12 of FIGURE 11 and to the same scale.
Figures 13, 15:
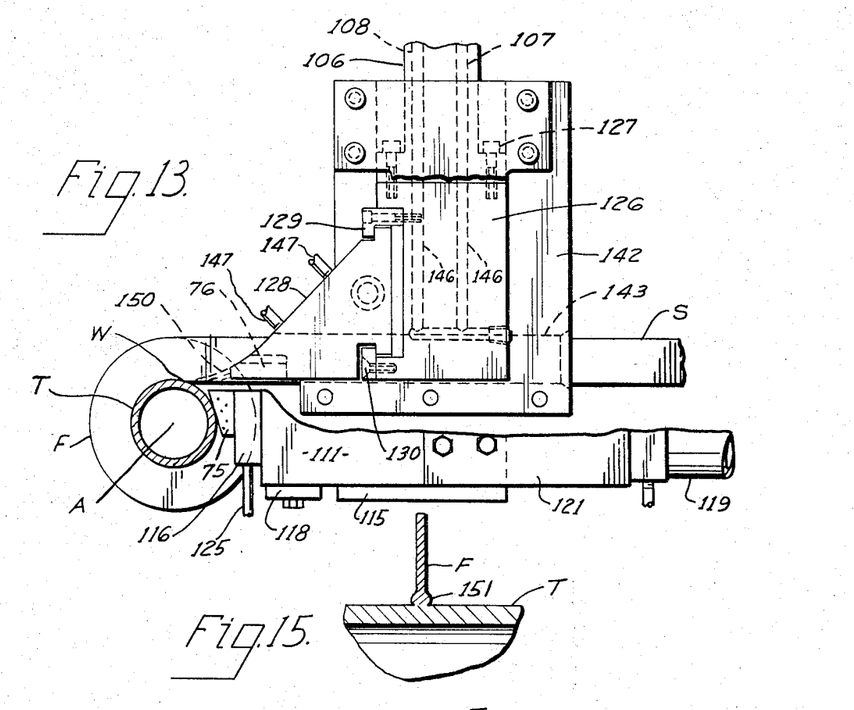
FIGURE 13 is a detail elevation, along line 13—13 of FIGURE 8 and to the same scale as FIGURES 9–12, showing details of the support for the fin-contacting electrode, and also showing the relationship of the tube-contacting and fin-contacting electrodes.
FIGURE 15 is a section along line 15—15 of FIGURE 14 but to a larger scale, of one of the fins welded to the tube, particularly showing the broader base portion of the fin that is welded to the tube.
Figure 14:
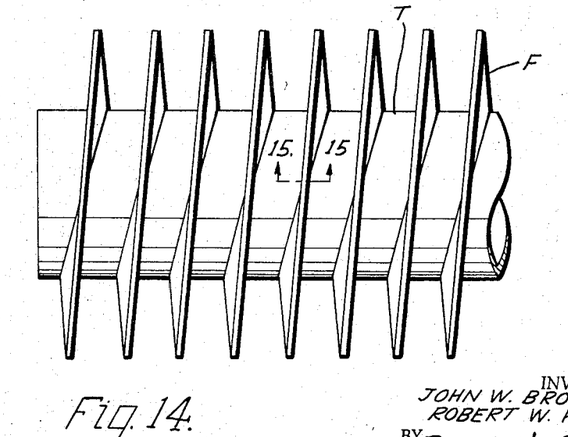
FIGURE 14 is a fragmentary side elevation to a scale larger than that of any of the preceding figures, of a portion of a helically finned tube embodying the invention.

The electrode 76 slidingly contacts one side of the strip S at its lower portion, preferably so the bottom of the electrode is essentially adjacent the bottom edge of the strip as shown in FIGURES 11 and 13, the distance from the electrode to the location W at which the strip first contacts the tube T, however, being substantially greater than the distance of electrode 75 from location W (see FIGURE 13). Since the electrode 76 slidingly contacts the side of the strip, there can be a substantial area of contact which permits efficient passage of electric current between the electrode and the strip and which prevents localized undesired overheating where the electrode 76 contacts the strip.

Consequently, welding current will flow on the tube along a short path extending between electrode 75 and location W, and along the lower portion of the strip S between location W and electrode 76 as indicated by the broken lines 150 in FIGURE 13. This current causes the lower portion of the strip S and the surface of the tube at the location W, which is of relatively small area, to be heated to welding temperature. Only the surface portions which come into contact at the welding location W ordinarily will be heated to the welding temperature and then only to a very shallow depth of metal, on the order of a few thousandths of an inch, the portions of the strip S and the tube away from the welding location W being substantially cooler because of the skin heating effect of the current and because of heat radiation from the tube and fin surfaces. Therefore, such more remote portions of the tube and fin are strong and hard enough to permit the surfaces of the strip S and the tube at the location W to be brought together by the roller 95 under sufficient force to produce a homogeneous continuous weld as the tube rotates and the strip S is fed to the tube.

Since only the portion of the strip in the vicinity of the welding location W is appreciably softened by heat and the cooler more remote portions of the strip are of substantially undiminished hardness and strength, several advantages are provided.

The inner edge portion of the strip being formed into a fin defines a shorter length around the tube than does the outer edge portion; a large portion of the upset-type deformation of the fin metal due to this difference in length can be localized in the softened portion of the fin adjacent the tube, although the portion of the strip nearer its outer edge appears to be stretched somewhat also to compensate for such differences in lengths between the inner and outer edges of the strip. The metal in the portion of the fin immediately adjacent the tube is compressed longitudinally of the fin due to the length difference, and transversely of the fin by the roller 95, so that the softened metal in the portion of the fin immediately adjacent the tube can broaden to thickness considerably greater than in the remainder of the fin as the welded joint is formed, as shown in FIGURE 15. This broadening also tends to be thus localized to the portion of the fin between the roller and the tube, by the groove 96 of roller 95.

FIGURE 15 shows a preferred finned tube structure in which the lower portion 151 of the fin F immediately adjacent to the tube T is considerably wider than the remainder of the fin, substantially uniformly throughout the length of the fin. This widened portion of the fin provides a greater welding area and hence a stronger weld joint, more stability of the fin and greater resistance to tilting relatively to the tube, a stronger fin, and more cross sectional area at the juncture of the fin and tube for effective transmission of heat between the tube and the fin. The heating and broadening of the portion of the fin adjacent to the tube also inhibits tendencies of the fin metal to wrinkle during the bending and welding of the fin.

As the tail end of a tube section T being welded approaches the vicinity of the drive unit 2 the welding current is cut off and the tube drive unit 2 halted. The roller 95 is raised and the strip S is cut from the finned tube. A succeeding tube section is passed through transmission unit 3 until its leading end abuts the tail end of the tube section having fins thereon. The drive unit 2 is started and the tail and leading end portions of the tubes are passed through unit 2 until the leading end of the unfinned tube passes under the roller 95. The above described process of starting the finning operation on the new tube is then repeated.

When the tail end of strip S reaches the immediate vicinity of the welding point W, the welding current is cut off and the operation of the apparatus is halted. The upper roller 95 is retracted and the leading end of the succeeding strip S from a new coil is threaded through the apparatus and brought into the vicinity of the welding point, where it may be spot welded to the tail end of the preceding strip S, or curved and welded to the tube as described above. Roller 95 is lowered into welding position, and the apparatus is started. Thus very little time is lost in starting a new strip.

The invention may be employed for applying helical fins or strips to tubes or pipes or other curved surfaces of steel, copper, aluminum or other metals or alloys thereof by suitable adjustment of the welding currents and the welding pressures. Although the invention has been discussed in connection with the application of welded helical fins to tubes, it may be employed to apply other types of helical strips to other elongated members of generally circular cross section, such as bars or rods.

The above and other modifications of the invention will be apparent to those skilled in the art. It is intended the patent shall cover by suitable expression in the appended claims whatever features of patentable novelty reside in the invention.

We claim:

1. Apparatus for bending and welding a metal strip having a single cross section helically on one of its edges about a generally cylindrical member having an axis, comprising means for supporting such generally cylindrical member, means for guiding the strip on edge at a desired helix angle relative to the axis of said generally cylindrical member and in a position whereby an edge of said strip advances generally tangentially into pressure engagement with said member at a welding location, means for effecting relative rotation between said generally cylindrical member and said strip and for effecting axial movement of said strip relative to said welding location, a source of electrical current of a frequency of at least about 50,000 cycles per second, an electrode connected to one terminal of said source and mounted to engage said cylindrical member at a point on the circumference thereof in advance of the welding location, another electrode connected to the other terminal of said source and mounted in a position to engage said strip substantially in advance of said welding location at a side of said strip at only a portion of said strip closely adjacent the edge that engages such generally cylindrical member, said source being adapted to supply sufficient current at said frequency to said member and said strip to heat only said edge portion of said strip and said generally cylindrical member at said welding location sufficiently to cause said edge of said strip and said surface to be welded without heating the remainder of the width of said strip sufficiently to diminish substantially the strength and hardness of the metal therein and without use of heating means other than said electrodes and the current supplied to said electrodes.

2. The apparatus of claim 1 in which the distance from the electrode contacting said strip to said welding location is substantially greater than the distance from said electrode contacting said member to said welding location.

3. The apparatus of claim 1 comprising means for supporting said generally cylindrical member for rotation about its axis and means for guiding said strip to said generally cylindrical member in a fixed path.

4. The apparatus of claim 3 in which said means for supporting said generally cylindrical member comprises a plurality of rollers for engaging said member at spaced points about the circumference thereof, at least one of said rollers being driven, said rollers being mounted about axes extending in spaced skewed relation to the axis of said member to cause said rollers to advance said member longitudinally past said welding location while rotating said member about its axis and supporting said member.

5. The apparatus of claim 4 in which said rollers are adjustable to change the skewed relation thereof to change the distance said generally cylindrical member travels during each revolution thereof.

6. In a welding apparatus for welding a helical strip of metal on an elongated generally cylindrical member, means for rotating and advancing the elongated member axially thereof along a pass line comprising a plurality of rotatable rollers adapted to engage the outer surface of said generally cylindrical member, said rollers being individually rotatable about axes extending generally longitudinally of said pass line and spaced around said pass line, and means for adjustably rotatably supporting said rollers so that the axis of rotation of each roller may be adjusted to a skewed relation to the pass line about an axis normal to said axis of rotation and normal to said pass line, one of said rollers being adjustably mounted for movement toward and away from said pass line.

7. In a welding apparatus for welding a helical strip of metal on an elongated generally cylindrical member, means for rotating and advancing the elongated member axially thereof along a pass line comprising a plurality of rotatable rollers adapted to engage the outer surface of said generally cylindrical member, said rollers being individually rotatable about axes extending generally longitudinally of said pass line and spaced around said pass line, and means for adjustably rotatably supporting said rollers so that the axis of rotation of each roller may be adjusted to a skewed relation to the pass line about an axis normal to said axis of rotation and normal to said pass line, each of said rollers comprising two generally frusto-conical portions spaced along the axis of rotation of said roller on opposite sides of the intersection of said axis with the axis normal thereto about which said axis of rotation is adjusted, the smaller portion of each of said frusto-conical portions being closer to said point of intersection than the larger portion thereof.

8. The method of applying, bending, and welding an advancing metal strip having a single cross section on an edge thereof to a metal surface that advances relatively to the strip while veering away from the strip in the direction of advance, which method comprises applying the terminals of a source of high frequency current respectively to the strip and to said surface at points thereon in advance of the point of application of the strip to said surface, for heating said surface and said edge of the strip contacting said surface to welding temperature at a welding location where said edge and said surface come into contact, said current being applied to said strip substantially in advance of said welding location at a side of said strip at only a portion of said strip closely adjacent the edge of said strip which is to be welded to cause current to flow along the surface of the portion of said strip closely adjacent said edge to be welded to said welding location and thence from said welding location along said surface of the metal member to the other terminal of the current source, pressing said strip against said metal member with substantial force directed transversely of the strip in the vicinity of said welding location, said current being of a frequency of at least about 50,000 cycles per second and sufficient to heat the portion of the metal member and only said edge portion of said strip that is to be welded in the vicinity of said welding location to the welding temperature and to a degree such that said strip edge becomes continuously welded to the member, without any substantial heating other than that caused by said flow of current so applied to said strip and said surface.

9. The method of claim 8 comprising pressing said strip against said surface with sufficient force directed transversely of the strip in the vicinity of said welding location, and with sufficient heating of the strip due to said application of current, to cause only the portion of said strip closely adjacent said metal surface to widen substantially due to compression of the metal along said edge portion while said strip bends along said surface.

10. The method of claim 9 in which said strip is pressed against said metal surface by the radial groove of a radially grooved roller rotating about an axis perpendicular to the strip at the location at which it is welded, said groove being of a depth sufficient to extend substantially across the portion of the width of said strip and aid in localizing said widening of said strip to the portion thereof in the immediate vicinity of said metal member.

References Cited
UNITED STATES PATENTS

| | | | |
|---|---|---|---|
| 1,909,704 | 5/1933 | Morseth | 219—107 |
| 2,107,831 | 2/1938 | Morseth | 219—107 |
| 2,174,928 | 10/1939 | Rumenschneider et al. | 219—81 |
| 2,344,790 | 3/1944 | Schryber | 219—81 |
| 2,376,762 | 4/1945 | Ferguson | 219—107 |
| 2,481,626 | 9/1949 | Schryber | 219—107 X |
| 2,965,744 | 12/1960 | Busse | 219—107 |
| 3,047,712 | 7/1962 | Morris | 219—107 |
| 3,140,378 | 7/1964 | Benninghoff | 219—107 X |

RICHARD M. WOOD, *Primary Examiner.*

B. A. STEIN, *Assistant Examiner.*